(12) United States Patent  (10) Patent No.: US 9,367,919 B2
Choi et al.  (45) Date of Patent: Jun. 14, 2016

(54) METHOD FOR ESTIMATING POSITION OF TARGET BY USING IMAGES ACQUIRED FROM CAMERA AND DEVICE AND COMPUTER-READABLE RECORDING MEDIUM USING THE SAME

(71) Applicant: National Institute of Meteorological Research, Jeju-do (KR)

(72) Inventors: Kyu Young Choi, Jeju-do (KR); Jong Chul Ha, Jeju-do (KR); Kwang Deuk Ahn, Jeju-do (KR); Hee Choon Lee, Seoul (KR)

(73) Assignee: National Institute of Meteorological Research, Jeju-do (KR)

( * ) Notice: Subject to any disclaimer, the term of this patent is extended or adjusted under 35 U.S.C. 154(b) by 0 days.

(21) Appl. No.: 14/988,969

(22) Filed: Jan. 6, 2016

(65) Prior Publication Data

US 2016/0117828 A1    Apr. 28, 2016

Related U.S. Application Data

(63) Continuation of application No. PCT/KR2015/003582, filed on Apr. 9, 2015.

(30) Foreign Application Priority Data

Apr. 11, 2014   (KR) .......................... 10-2014-0043517

(51) Int. Cl.
*G06K 9/00* (2006.01)
*G06T 7/00* (2006.01)

(52) U.S. Cl.
CPC .............. *G06T 7/0044* (2013.01); *G06T 7/0081* (2013.01); *G06T 2207/20021* (2013.01); *G06T 2207/20076* (2013.01)

(58) Field of Classification Search
None
See application file for complete search history.

(56) References Cited

U.S. PATENT DOCUMENTS

| 8,649,632 | B2* | 2/2014 | Neophytou | ........ G06K 9/00214 382/285 |
| 2008/0112699 | A1* | 5/2008 | Huseth | .................... H04N 5/247 396/89 |
| 2010/0176987 | A1* | 7/2010 | Hoshizaki | ............... G01S 19/48 342/357.23 |
| 2011/0135157 | A1* | 6/2011 | Cho | ...................... G06T 7/0042 382/106 |
| 2014/0320488 | A1* | 10/2014 | Ege | ......................... G06T 17/05 345/420 |
| 2014/0320495 | A1* | 10/2014 | Clarberg | ................ G06T 15/10 345/423 |

* cited by examiner

*Primary Examiner* — Nancy Bitar
(74) *Attorney, Agent, or Firm* — Husch Blackwell LLP

(57) ABSTRACT

A method for estimating a position of a target by using an image acquired from a camera is provided. The method includes the steps of: (a) setting multiple virtual estimated reference points by dividing a view-path; (b) comparing altitude values of the respective estimated reference points with those of respective points on terrain; (c) searching neighboring virtual estimated reference points among the multiple virtual estimated reference points to satisfy a requirement under which a difference between an altitude $z_k$ of one point among the neighboring estimated reference points and that of the terrain corresponding thereto and a difference between an altitude $z_{k+1}$ of the other point among the neighboring estimated reference points and that of the terrain corresponding thereto have different signs; and (d) determining that the actual position of the target exists between the searched estimated reference points $P_k$.

14 Claims, 4 Drawing Sheets

METHOD FOR ESTIMATING POSITION OF
TARGET BY USING IMAGES ACQUIRED
FROM CAMERA AND DEVICE AND
COMPUTER-READABLE RECORDING
MEDIUM USING THE SAME

CROSS REFERENCE TO RELATED
APPLICATIONS

This application is a continuation of prior International Application PCT Application No. PCT/KR2015/003582 filed on Apr. 9, 2015, which claims the benefit of priority from Korean Patent Application No. 10-2014-0043517 filed on Apr. 11, 2014. The disclosures of International Application PCT Application No. PCT/KR2015/003582 and Korean Patent Application No. 10-2014-0043517 are incorporated herein by reference.

FIELD OF THE INVENTION

The present invention relates to a method for estimating a position of a target by using an image acquired from a camera and a device and a computer-readable recording medium using the same; and more particularly, to the method, the device, and the computer-readable recording medium for (i) setting multiple virtual estimated reference points by dividing a view-path, i.e., a virtual straight path from a geoid to the camera, on which the target is located, equally into a natural number which is a number of 2 or higher, (ii) comparing altitude values of the respective virtual estimated reference points existing between the point at which the view-path and the geoid intersect and the position of the camera with those of respective actual terrains corresponding to the respective virtual estimated reference points, to thereby search neighboring virtual estimated reference points which satisfy a requirement under which a difference between an altitude of one estimated reference point among the neighboring virtual estimated reference points and that of an actual terrain corresponding thereto and a difference between an altitude of the other estimated reference point among the neighboring virtual estimated reference points and that of an actual terrain corresponding thereto have different signs, and (iii) determining that the position of the target exists between the searched neighboring virtual estimated reference points.

BACKGROUND OF THE INVENTION

A method for estimating a position of a target by using an image acquired from a camera is generally called a camera modeling technique. According to the camera modeling technique, a relationship between a position on a two-dimensional image and that on a three-dimensional space may be established.

In addition, according to the camera modeling technique, a concept of "view-path" may be introduced. The "view-path" represents a virtual straight path connecting a position of a camera with which an image is taken and that of a target. If physical phenomena such as atmospheric refraction are not considered, the view-path is generally modeled as a straight line. One of the most important purposes of the camera modeling technique is to get information on the accurate position of the target.

FIG. 4 shows a method for estimating a position of a target by using an image acquired from a camera according to an example of the prior art.

By referring to FIG. 4, a point C $(x_n, y_n, z_n)$ represents a position of the camera in three-dimensional coordinate system and a point O $(x_0, y_0, z_0)$ shows a point where a view-path, which is a virtual straight line passing through the position of the camera and that of a target 410, and the geoid intersect in the three-dimensional coordinate system.

More specifically, by referring to FIG. 4, a ray tracing algorithm is illustrated as a method for estimating the position of the target 410 by using the image acquired from the camera. According to the ray tracing algorithm method 440, a point where the view path and the altitude of the terrain intersect can be searched by using iterating operation. However, it has a drawback in that a lot of iterating computations are required, as the case may be. Specifically, if a slope of the earth surface is larger than an incidence angle of ray, a tracking path caused by the iterating operation may not converge on a point so that there is a possibility that computations can be infinitely iterated. Because such a problem frequently occurs to terrains whose actual altitude values 420 are sharply changing and there are, in fact, many terrains whose actual altitude values 420 are sharply changing, there are many cases that the position of the target cannot be estimated by using the ray tracing algorithm.

In addition, if the position of the target is estimated by using multiple pixels, the number of iterating operation per pixel may be different so that multi-processing cannot be executed. Thus, there is a problem of failing to improve the speed of calculation for estimating the position of the target.

SUMMARY OF THE INVENTION

It is an object of the present invention to solve all the problems mentioned above.

It is another object of the present invention to make an accurate position of a target identified within a shorter time by allowing respective difference values between respective estimated reference points selected by dividing a view-path equally into a natural number and respective altitude values of terrains corresponding to the respective estimated reference points to be calculated simultaneously.

It is still another object of the present invention to make the accurate position of the target estimated with relatively less computational effort by avoiding the occurrence of infinite.

In accordance with one aspect of the present invention, there is provided a method for estimating a position of a target by using an image acquired from a camera, including the steps of: (a) setting multiple virtual estimated reference points by dividing a view-path, as a virtual straight path from a geoid to the camera, where the target is located, into a natural number which is 2 or higher number; (b) comparing altitude values of the respective estimated reference points existing between O $(x_0, y_0, z_0)$ as a point where the view-path and the geoid intersect and C $(x_n, y_n, z_n)$ as a position of the camera with those of respective points on terrain corresponding to the respective estimated reference points; (c) searching neighboring virtual estimated reference points $P_k$ $(x_k, y_k, z_k)$ and $P_{k+1}$ $(x_{k+1}, y_{k+1}, z_{k+1})$ among the multiple virtual estimated reference points to satisfy a requirement under which a difference between an altitude $z_k$ of one point $P_k$ $(x_k, y_k, z_k)$ among the neighboring estimated reference points and that of the terrain corresponding thereto and a difference between an altitude $z_{k+1}$ of the other point $P_{k+1}$ $(x_{k+1}, y_{k+1}, z_{k+1})$ among the neighboring estimated reference points and that of the terrain corresponding thereto have different signs; and (d) determining that the actual position of the target exists between the searched estimated reference points $P_k$ $(x_k, y_k, z_k)$ and $P_{k+1}$ $(x_{k+1}, y_{k+1}, z_{k+1})$.

In accordance with another aspect of the present invention, there is provided a method of estimating a position of a target from an image acquired from a camera, including the steps of: (a) setting multiple virtual estimated reference points by dividing a section between 0 ($x_0$, $y_0$, $z_0$) as a point where a view-path, as a virtual straight path from a geoid to the camera, on which the target is located and the geoid intersect and B ($x_n$, $y_n$, $z_n$) as a point on the view-path determined by referring to one of top n altitude values of terrain included in the image among all sections of the view-path into m which is a number of 2 or higher; (b) comparing altitude values of the multiple virtual estimated reference points existing between B ($x_n$, $y_n$, $z_n$) and O ($x_0$, $y_0$, $z_0$) on the view-path with those of respective points on the terrain corresponding thereto; (c) searching neighboring virtual estimated reference points $P_k$ ($x_k$, $y_k$, $z_k$) and $P_{k+1}$ ($x_{k+1}$, $y_{k+1}$, $z_{k+1}$) among the multiple virtual, estimated reference points to satisfy a requirement under which a difference between an altitude $z_k$ of one point $P_k$ ($x_k$, $y_k$, $z_k$) among the neighboring estimated reference points and that of the terrain corresponding thereto and a difference between an altitude $z_{k+1}$ of the other point $P_{k+1}$ ($x_{k+1}$, $y_{k+1}$, $z_{k+1}$) among the neighboring estimated reference points and that of the terrain corresponding thereto have different signs; and (d) determining that the actual position of the target exists between the searched estimated reference points $P_k$ ($x_k$, $y_k$, $z_k$) and $P_{k+1}$ ($x_{k+1}$, $y_{k+1}$, $z_{k+1}$).

In accordance with still another aspect of the present invention, there is provided a device for estimating a position of a target from an image acquired from a camera, including: an estimated reference points-setting part for setting multiple virtual estimated reference points by dividing a view-path, as a virtual straight path from a geoid to the camera, where the target is located, into a natural number which is 2 or higher number; an altitude-comparing part for comparing altitude values of the respective estimated reference points existing between O ($x_0$, $y_0$, $z_0$) as a point where the view-path and the geoid intersect and C ($x_n$, $y_n$, $z_n$) as a position of the camera with those of respective points on terrain corresponding to the respective estimated reference points; a target position-determining part for searching neighboring virtual estimated reference points $P_k$ ($x_k$, $y_k$, $z_k$) and $P_{k+1}$ ($x_{k+1}$, $y_{k+1}$, $z_{k+1}$) among the multiple virtual estimated reference points to satisfy a requirement under which a difference between an altitude $z_k$ of one point $P_k$ ($x_k$, $y_k$, $z_k$) among the neighboring estimated reference points and that of the terrain corresponding thereto and a difference between an altitude $z_{k+1}$ of the other point $P_{k+1}$ ($x_{k+1}$, $y_{k+1}$, $z_{k+1}$) among the neighboring estimated reference points and that of the terrain corresponding thereto have different signs; and determining that the actual position of the target exists between the searched estimated reference points $P_k$ ($x_k$, $y_k$, $z_k$) and $P_{k+1}$ ($x_{k+1}$, $y_{k+1}$, $z_{k+1}$).

In accordance with still yet another aspect of the present invention, there is provided a device for estimating a position of a target from an image acquired from a camera, including: an estimated reference points-setting part for setting multiple virtual estimated reference points by dividing a section between 0 ($x_0$, $y_0$, $z_0$) as a point where a view-path, as a virtual straight path from a geoid to the camera, on which the target is located and the geoid intersect and B ($x_n$, $y_n$, $z_n$) as a point on the view-path determined by referring to one of top n altitude values of terrain included in the image among all sections of the view-path into m which is a number of 2 or higher; an altitude-comparing part for comparing altitude values of the multiple virtual estimated reference points existing between B ($x_n$, $y_n$, $z_n$) and O ($x_0$, $y_0$, $z_0$) on the view-path with those of respective points on the terrain corresponding thereto; and a target position-determining part for searching neighboring virtual estimated reference points $P_k$ ($x_k$, $y_k$, $z_k$) and $P_{k+1}$ ($x_{k+1}$, $y_{k+1}$, $z_{k+1}$) among the multiple virtual estimated reference points to satisfy a requirement under which a difference between an altitude $z_k$ of one point $P_k$ ($x_k$, $y_k$, $z_k$) among the neighboring estimated reference points and that of the terrain corresponding thereto and a difference between an altitude $z_{k+1}$ of the other point $P_{k+1}$ ($x_{k+1}$, $y_{k+1}$, $z_{k+1}$) among the neighboring estimated reference points and that of the terrain corresponding thereto have different signs and then determining that the actual position of the target exists between the searched estimated reference points $P_k$ ($x_k$, $y_k$, $z_k$) and $P_{k+1}$ ($x_{k+1}$, $y_{k+1}$, $z_{k+1}$).

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
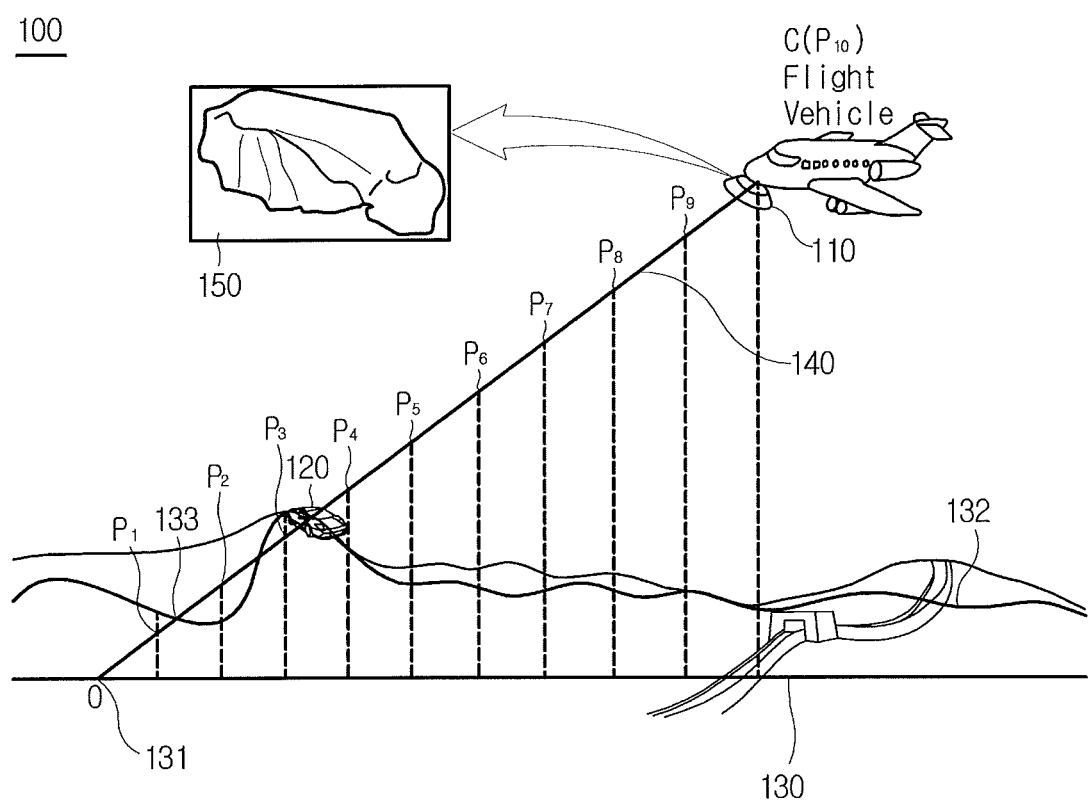
FIG. 1 is a drawing representing a method for estimating a position of a target by using an image acquired from a camera in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

FIG. 1 represents a method for estimating a position of a target by using an image acquired from a camera in accordance with one example embodiment of the present invention. In FIG. 1, a view-path 140 means a virtual straight line viewed from a camera 110 installed in a flight vehicle, etc. to a target 120. According to the definition, the target 120 is located on the view-path. In accordance with one example embodiment of the present invention, a method for easily estimating a position of the target 120 by using an image 150 acquired from the camera 110 may be provided by dividing the view-path 140 equally.

First of all, a method for estimating the position of the target by using the image acquired from the camera may be explained by using FIG. 1 as follows:

If a point 131 where a geoid 130 and the view-path 140 intersect is set as a reference point O, multiple virtual points which are determined by dividing the view-path 140 between the reference point and the position of the camera 110 equally into an arbitrary natural number n (which is a number of 2 or higher) are called estimated reference points.

The respective altitude values of such multiple virtual estimated reference points are compared with those of actual terrains 132 corresponding to the respective estimated reference points. In detail, the respective altitude values of intersecting points where respective virtual straight lines drawn vertically down to the geoid 130 from the respective estimated reference points intersect with the actual terrains 132 are compared with those of their corresponding estimated reference points.

Among the multiple virtual estimated reference points, $P_k$ ($x_k$, $y_k$, $z_k$) and $P_{k+1}$ ($x_{k+1}$, $y_{k+1}$, $z_{k+1}$) as neighboring estimated reference points are searched. In detail, they may be searched to satisfy a requirement under which a difference between $z_k$, i.e., the altitude of $P_k$ ($x_k$, $y_k$, $z_k$), and that of the actual terrain corresponding thereto and a difference between $z_{k+1}$, i.e., the altitude of $P_{k+1}$ ($x_{k+1}$, $y_{k+1}$, $z_{k+1}$), and that of the actual terrain corresponding thereto have different signs. That is, if the difference between the altitude of one estimated reference point among the searched neighboring estimated reference points and that of the actual terrain corresponding thereto has a positive value, the difference between the altitude of the other estimated reference point among the searched neighboring estimated reference points and that of the actual terrain corresponding thereto would have a negative value.

If a pair of neighboring estimated reference points that satisfy the requirement is searched, it could be determined that the target is located between a pair of the neighboring estimated reference points.

However, if there are 2 or more pairs of neighboring estimated reference points that satisfy the requirement, the actual position of the target may be determined to be located between a specific pair of the estimated reference points closest to the camera 110.

More specifically, virtual estimated reference points from $P_1$ ($x_1$, $y_1$, $z_1$) to $P_{10}$ ($x_{10}$, $y_{10}$, $z_{10}$) are selected by dividing the view-path 140 into ten equal parts and their altitude values are compared with those of actual terrains 132 corresponding thereto in FIG. 1. Of course, $P_{10}$ ($x_{10}$, $y_{10}$, $z_{10}$), i.e., the position of the camera 110, can be excluded from the consideration. Herein, since respective operations of comparing the altitude values of respective estimated reference points and those of actual terrains corresponding thereto are performed simultaneously, the position of the target can be found at a much faster speed. For reference, it would be sure that the reference point O can be treated as another estimated reference point $P_0$.

According to FIG. 1, there are two pairs of estimated reference points that satisfy the requirement under which a difference between $z_k$, i.e., the altitude of $P_k$ ($x_k$, $y_k$, $z_k$), and that of the actual terrain corresponding thereto and a difference between $z_{k+1}$, i.e., the altitude of $P_{k+1}$ ($x_{k+1}$, $y_{k+1}$, $z_{k+1}$), and that of the actual terrain corresponding thereto have different signs. More specifically, the first pair, i.e., $P_1$ ($x_1$, $y_1$, $z_1$) and $P_2$ ($x_2$, $y_2$, $z_2$), and the second pair, i.e., $P_3$ ($x_3$, $y_3$, $z_3$) and $P_4$ ($x_4$, $y_4$, $z_4$), as the neighboring estimated reference points satisfy the requirement. Because there are more than one pair that satisfy the requirement, it is determined that the actual position of the target 120 is between $P_3$ ($x_3$, $y_3$, $z_3$) and $P_4$ ($x_4$, $y_4$, $z_4$) which is a pair of estimated reference points closest to the camera 110 among the two pairs that satisfy the requirement. From the perspective of the camera 110, a position 133 is not a matter under consideration because it is not visible due to a high terrain near the estimated reference point P3 and it is not shown in the taken image.

Figure 2:
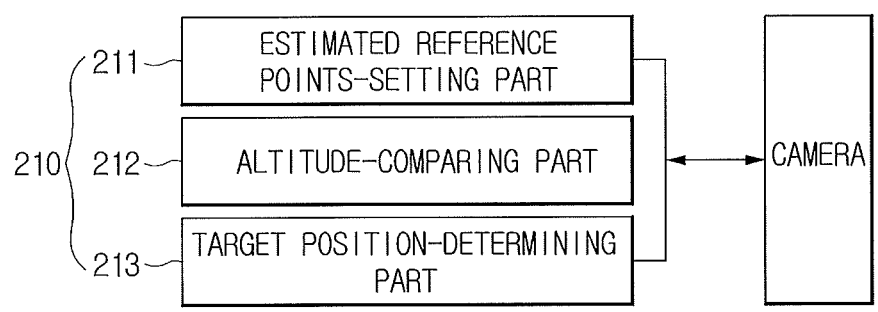
FIG. 2 is a block diagram showing a configuration of a device for estimating the position of the target in accordance with an example embodiment of the present invention.

FIG. 2 shows a configuration of a device for estimating a position of a target in accordance with an example embodiment of the present invention. The device for estimating a position of a target 210 may include an estimated reference points-setting part 211, an altitude-comparing part 212, and a target position-determining part 213.

The estimated reference points-setting part 211 may set multiple virtual estimated reference points by dividing a view-path equally into n, i.e., an arbitrary natural number which is a number of 2 or higher, and the altitude-comparing part 212 may compare respective altitude values of the multiple estimated reference points existing between a point where the view-path and the geoid intersect and a position of the camera with those of actual terrains corresponding to the multiple estimated reference points. The target position-determining part 213 may search neighboring virtual estimated reference points, e.g., ($x_k$, $y_k$, $z_k$) and ($x_{k+1}$, $y_{k+1}$, $z_{k+1}$), among the multiple virtual estimated reference points which satisfy the requirement under which the difference between an altitude $z_k$ of ($x_k$, $y_k$, $z_k$) and that of an actual terrain corresponding to ($x_k$, $y_k$, $z_k$) and the difference between an altitude $z_{k+1}$ of ($x_{k+1}$, $y_{k+1}$, $z_{k+1}$) and that of an actual terrain corresponding to ($x_{k+1}$, $y_{k+1}$, $z_{k+1}$) have different signs and then determine that the actual position of the target exists on a section of the view-path between ($x_k$, $y_k$, $z_k$) and ($x_{k+1}$, $y_{k+1}$, $z_{k+1}$).

Besides, if there is more than one pair of neighboring estimated reference points that satisfy the requirement, the target position-determining part 213 may determine that the actual position of the target is located between a specific pair of the estimated reference points closest to the camera.

Figure 3:
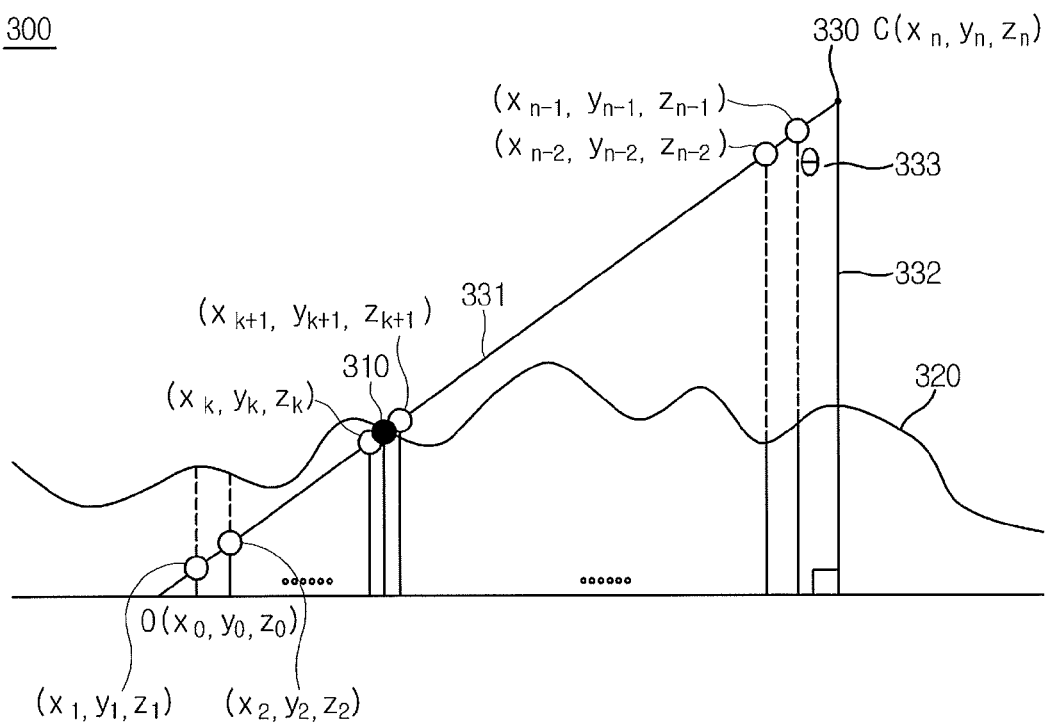
FIG. 3 illustrates a method for estimating the position of the target in accordance with an example embodiment of the present invention.
Figure 4:
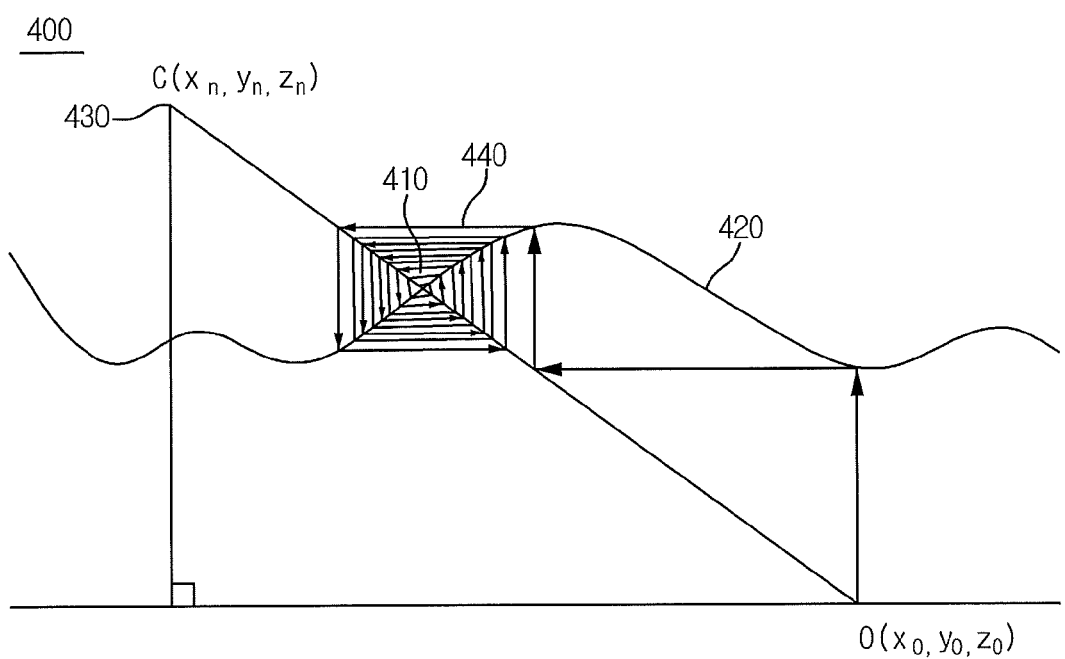
FIG. 4 shows a method for estimating a position of a target by using an image acquired from a camera according to an example of the prior art.

FIG. 3 is a drawing that illustrates a method for estimating the position of the target in accordance with an example embodiment of the present invention. It illustrates that the position of the actual target is estimated by calculating a view path 331 by referring to an altitude 332 and an angle 333 of the camera and then comparing values of altitude of multiple points selected by dividing the view-path 331 with corresponding values of altitude of actual terrain 320.

More specifically, a length of the view-path 331 can be determined as $z_n \cdot \sec \theta$ and thus an error margin with respect to the estimation of the position 310 of the target may be determined as $n^{-1} \cdot z_n \cdot \sec \theta$ if the length is divided equally into n.

For example, if a value of $z_n$ is 300,000 centimeters and $\theta$ is 45°, the length of the view-path 331 is drawn as $300,000\sqrt{2}$. Further, if the length of the view-path 331 is divided into $2^9$ or 512, the error margin is drawn roughly as 828.64 cm. Furthermore, if it is divided one more time into 512, the error margin is drawn roughly as 1.62 cm. Compared to the conventional method for estimating the position of the target, it, therefore, would be possible to estimate the position of the target more accurately with relatively fewer computations, i.e., two iterations. Further, the calculation speed may be improved compared to the conventional method by multiprocessing with which multiple pixels are calculated at the same time by using arrays (($x_1$, $y_1$, $z_1$) ... ($x_{512}$, $y_{512}$, $z_{512}$)).

Additionally, in accordance with the present invention, if the actual altitude value of $P_{207}$ (97031.25, 72773.44, 121289.1) is 121500 cm and that of $P_{208}$ (97500, 73125, 121875) is 121400 cm by dividing the view-path between a reference point O (0, 0, 0) and C (240000, 180000, 300000) equally into 512, the target 310 is estimated to be located between $P_{207}$ (97031.25, 72773.44, 121289.1) and $P_{208}$ (97500, 73125, 121875). Further, the position of the target 310 could be estimated as a relatively more approximate value by resetting $P_{207}$ as a reference point $(x_0, y_0, z_0)$ instead of the point O and $P_{208}$ as $(x_m, y_m, z_m)$ instead of the point C, and then by subdividing the section between $P_{207}$ and $P_{208}$ equally into 512 (or m, an arbitrary natural number, which is a number of 2 or higher). Accordingly, the position of the target 310 could be estimated more accurately.

It was explained on assumption that the whole section between the point where the view-path and the geoid intersect and the position of the camera is equally divided but it is not limited to this.

For example, in accordance with another example embodiment of the present invention, if a point on the view-path determined by referring to one of top n altitude values among multiple peaks in the terrain included in the acquired image is B $(x_n, y_n, z_n)$, the above-described multiple virtual estimated reference points could be also set by dividing the section between B $(x_n, y_n, z_n)$ and O $(x_0, y_0, z_0)$ into an arbitrary natural number m which is a number of 2 or higher. For reference, this would be performed by the estimated reference points-setting part as mentioned above. Herein, B $(x_n, y_n, z_n)$ could be determined as a point which has $z_n$ as same as a point selected as one of top n altitude values among multiple peaks in the actual terrain included in the acquired image.

In this regard, the respective altitude values of the multiple virtual estimated reference points existing between B $(x_n, y_n, z_n)$ and O $(x_0, y_0, z_0)$ would be compared with those of the respective actual terrains corresponding thereto (This would be performed by the altitude-comparing part as mentioned above). Among the multiple estimated reference points, neighboring virtual estimated reference points $P_k (x_k, y_k, z_k)$ and $P_{k+1} (x_{k+1}, y_{k+1}, z_{k+1})$ could be searched to satisfy a requirement under which a difference between an altitude $z_k$ of one neighboring estimated reference point $P_k (x_k, y_k, z_k)$ and that of an actual terrain corresponding to the former and a difference between an altitude $z_{k+1}$ of the other $P_{k+1} (x_{k+1}, y_{k+1}, z_{k+1})$ and that of an actual terrain corresponding to the latter have different signs and then it would be determined that the actual position of the target exists between the searched estimated reference points $P_k (x_k, y_k, z_k)$ and $P_{k+1} (x_{k+1}, y_{k+1}, z_{k+1})$ (This would be performed by the target position-determining part).

As such, in accordance with the other example embodiment of the present invention, if m is less than n, the calculation speed could be faster and if m equals to n, the relatively shorter section could be more closely subdivided and therefore, a more accurate result value could be obtained.

The present invention has an effect of identifying the accurate position of the target within a shorter time because the respective difference values between the altitude values of terrains corresponding to the respective estimated reference points and those of the respective estimated reference points are calculated at the same time.

In addition, the present invention has an effect of estimating the accurate position of the target with relatively fewer computations.

The embodiments of the present invention may be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variation equal or equivalent to the patent claims pertain to the category of the thought of the present invention.

What is claimed is:

1. A method for estimating a position of a target by using an image acquired from a camera, comprising the steps of:
    (a) setting multiple virtual estimated reference points by dividing a view-path, as a virtual straight path from a geoid to the camera, where the target is located, into a natural number which is 2 or higher number;
    (b) comparing altitude values of the respective estimated reference points existing between O $(x_0, y_0, z_0)$ as a point where the view-path and the geoid intersect and C $(x_n, y_n, z_n)$ as a position of the camera with those of respective points on terrain corresponding to the respective estimated reference points;
    (c) searching neighboring virtual estimated reference points $P_k (x_k, y_k, z_k)$ and $P_{k+1} (x_{k+1}, y_{k+1}, z_{k+1})$ among the multiple virtual estimated reference points to satisfy a requirement under which a difference between an altitude $z_k$ of one point $P_k (x_k, y_k, z_k)$ among the neighboring estimated reference points and that of the terrain corresponding thereto and a difference between an altitude $z_{k+1}$ of the other point $P_{k+1} (x_{k+1}, y_{k+1}, z_{k+1})$ among the neighboring estimated reference points and that of the terrain corresponding thereto have different signs; and
    (d) determining that the actual position of the target exists between the searched estimated reference points $P_k (x_k, y_k, z_k)$ and $P_{k+1} (x_{k+1}, y_{k+1}, z_{k+1})$.

2. The method of claim 1, wherein, at the step (d), if there is more than one pair of neighboring estimated reference points that satisfy the requirement at the step (c), it is determined that the actual position of the target exists between a specific pair of neighboring estimated reference points closest from the camera.

3. The method of claim 1, wherein, at the step (b), upon the comparison between the altitude values of the respective virtual estimated reference points and those of the respective points on the terrain corresponding thereto, altitude values of respective intersecting points where respective virtual vertical straight lines from the respective virtual estimated reference points to the geoid and the terrain intersect are compared with those of the respective estimated reference points.

4. The method of claim 1, further comprising the step of:

(e) setting multiple virtual subdivided reference points by dividing the view-path between $P_k$ ($x_k$, $y_k$, $z_k$) and $P_{k+1}$ ($x_{k+1}$, $y_{k+1}$, $z_{k+1}$) into m which is a number of 2 or higher, and performing operations with the multiple virtual subdivided reference points existing between $P_k$ ($x_k$, $y_k$, $z_k$) and $P_{k+1}$ ($x_{k+1}$, $y_{k+1}$, $z_{k+1}$) similarly to the operations with the multiple virtual estimated reference points existing between O ($x_0$, $y_0$, $z_0$) and C ($x_n$, $y_n$, $z_n$) at the steps (b), (c), and (d), to thereby search the actual position of the target between $P_{k1}$ ($x_{k1}$, $y_{k1}$, $z_{k1}$) and $P_{k1+1}$ ($x_{k1+1}$, $y_{k1+1}$, $z_{k1+1}$).

5. The method of claim 4, wherein m is set just as same as n.

6. A method of estimating a position of a target from an image acquired from a camera, comprising the steps of:

(a) setting multiple virtual estimated reference points by dividing a section between 0 ($x_0$, $y_0$, $z_0$) as a point where a view-path, as a virtual straight path from a geoid to the camera, on which the target is located and the geoid intersect and B ($x_n$, $y_n$, $z_n$) as a point on the view-path determined by referring to one of top n altitude values of terrain included in the image among all sections of the view-path into m which is a number of 2 or higher;

(b) comparing altitude values of the multiple virtual estimated reference points existing between B ($x_n$, $y_n$, $z_n$) and O ($x_0$, $y_0$, $z_0$) on the view-path with those of respective points on the terrain corresponding thereto;

(c) searching neighboring virtual estimated reference points $P_k$ ($x_k$, $y_k$, $z_k$) and $P_{k+1}$ ($x_{k+1}$, $y_{k+1}$, $z_{k+1}$) among the multiple virtual estimated reference points to satisfy a requirement under which a difference between an altitude $z_k$ of one point $P_k$ ($x_k$, $y_k$, $z_k$) among the neighboring estimated reference points and that of the terrain corresponding thereto and a difference between an altitude $z_{k+1}$ of the other point $P_{k+1}$ ($x_{k+1}$, $y_{k+1}$) among the neighboring estimated reference points and that of the terrain corresponding thereto have different signs; and (d) determining that the actual position of the target exists between the searched estimated reference points $P_k$ ($x_k$, $y_k$, $z_k$) and $P_{k+1}$ ($x_{k+1}$, $y_{k+1}$, $z_{k+1}$).

7. The method of claim 6, wherein B ($x_n$, $y_n$, $z_n$) on the view-path is determined as a point that has $z_n$ as the same value as the point selected as one of top n altitude values of the terrain included in the acquired image.

8. A device for estimating a position of a target from an image acquired from a camera, comprising:

an estimated reference points-setting part for setting multiple virtual estimated reference points by dividing a view-path, as a virtual straight path from a geoid to the camera, where the target is located, into a natural number which is 2 or higher number;

an altitude-comparing part for comparing altitude values of the respective estimated reference points existing between O ($x_0$, $y_0$, $z_0$) as a point where the view-path and the geoid intersect and C ($x_n$, $y_n$, $z_n$) as a position of the camera with those of respective points on terrain corresponding to the respective estimated reference points;

a target position-determining part for searching neighboring virtual estimated reference points $P_k$ ($x_k$, $y_k$, $z_k$) and $P_{k+1}$ ($x_{k+1}$, $y_{k+1}$, $z_{k+1}$) among the multiple virtual estimated reference points to satisfy a requirement under which a difference between an altitude $z_k$ of one point $P_k$ ($x_k$, $y_k$, $z_k$) among the neighboring estimated reference points and that of the terrain corresponding thereto and a difference between an altitude of the other point $P_{k+1}$ ($x_{k+1}$, $y_{k+1}$, $z_{k+1}$) among the neighboring estimated reference points and that of the terrain corresponding thereto have different signs; and determining that the actual position of the target exists between the searched estimated reference points $P_k$ ($x_k$, $y_k$, $z_k$) and $P_{k+1}$ ($x_{k+1}$, $y_{k+1}$, $z_{k+1}$).

9. The device of claim 8, wherein, if there is more than one pair of neighboring estimated reference points that satisfy the requirement, the target position-determining part determines that the actual position of the target exists between a specific pair of neighboring estimated reference points closest from the camera.

10. The device of claim 8, wherein, upon the comparison between the altitude values of the respective virtual estimated reference points and those of the respective points on the terrain corresponding thereto, the altitude-comparing part compares altitude values of respective intersecting points where respective virtual vertical straight lines from the respective virtual estimated reference points to the geoid and the terrain intersect with those of the respective estimated reference points.

11. The device of claim 8, wherein the target position-determining part sets multiple virtual subdivided reference points by dividing the view-path between $P_k$ ($x_k$, $y_k$, $z_k$) and $P_{k+1}$ ($x_{k+1}$, $y_{k+1}$, $z_{k+1}$) into m which is a number of 2 or higher, and performs operations with the multiple virtual subdivided reference points existing between $P_k$ ($x_k$, $y_k$, $z_k$) and $P_{k+1}$ ($x_{k+1}$, $y_{k+1}$, $z_{k+1}$) similarly to the operations with the multiple virtual estimated reference points existing between O ($x_0$, $y_0$, $z_0$) and C ($x_n$, $y_n$, $z_n$), to thereby search the actual position of the target between $P_{k1}$ ($x_{k1}$, $y_{k1}$, $z_{k1}$) and $P_{k1+1}$ ($x_{k1+1}$, $y_{k1+1}$, $z_{k1+1}$).

12. The device of claim 11, wherein m is set just as same as n.

13. A device for estimating a position of a target from an image acquired from a camera, comprising:

an estimated reference points-setting part for setting multiple virtual estimated reference points by dividing a section between 0 ($x_0$, $y_0$, $z_0$) as a point where a view-path, as a virtual straight path from a geoid to the camera, on which the target is located and the geoid intersect and B ($x_n$, $y_n$, $z_n$) as a point on the view-path determined by referring to one of top n altitude values of terrain included in the image among all sections of the view-path into m which is a number of 2 or higher;

an altitude-comparing part for comparing altitude values of the multiple virtual estimated reference points existing between B ($x_n$, $y_n$, $z_n$) and O ($x_0$, $y_0$, $z_0$) on the view-path with those of respective points on the terrain corresponding thereto; and a target position-determining part for searching neighboring virtual estimated reference points $P_k$ ($x_k$, $y_k$, $z_k$) and $P_{k+1}$ ($x_{k+1}$, $y_{k+1}$, $z_{k+1}$) among the multiple virtual estimated reference points to satisfy a requirement under which a difference between an altitude $z_k$ of one point $P_k$ ($x_k$, $y_k$, $z_k$) among the neighboring estimated reference points and that of the terrain corresponding thereto and a difference between an altitude $z_{k+1}$ of the other point $P_{k+1}$ ($x_{k+1}$, $y_{k+1}$, $z_{k+1}$) among the neighboring estimated reference points and that of the terrain corresponding thereto have different signs and then determining that the actual position of the target exists between the searched estimated reference points $P_k$ ($x_k$, $y_k$, $z_k$) and $P_{k+1}$ ($x_{k+1}$, $y_{k+1}$, $z_{k+1}$).

14. The device of claim 13, wherein B ($x_n$, $y_n$, $z_n$) on the view-path is determined as a point that has $z_n$ as the same value as the point selected as one of top n altitude values of the terrain included in the acquired image.

\* \* \* \* \*